United States Patent
Zynda et al.

(10) Patent No.: US 9,096,152 B2
(45) Date of Patent: Aug. 4, 2015

(54) INCLINATION ADJUSTER FOR VEHICLE SEATS

(75) Inventors: Martin Zynda, Burscheid (DE); Cornel Labuwy, Remscheid (DE); Michael Moog, Solingen (DE); Holger Finner, Hueckeswagen (DE); Ingo Kienke, Wermelskirchen (DE); Albert Reginold Kirubaharan, Burscheid (DE)

(73) Assignee: Johnson Controls Technology Company, Holland, MI (US)

( * ) Notice: Subject to any disclaimer, the term of this patent is extended or adjusted under 35 U.S.C. 154(b) by 418 days.

(21) Appl. No.: 13/509,267

(22) PCT Filed: Nov. 4, 2010

(86) PCT No.: PCT/EP2010/006707
§ 371 (c)(1),
(2), (4) Date: Aug. 29, 2012

(87) PCT Pub. No.: WO2011/057735
PCT Pub. Date: May 19, 2011

(65) Prior Publication Data
US 2012/0326485 A1    Dec. 27, 2012

(30) Foreign Application Priority Data

Nov. 11, 2009  (DE) .......................... 10 2009 052 512

(51) Int. Cl.
*B60N 2/225* (2006.01)
*B60N 2/68* (2006.01)

(52) U.S. Cl.
CPC .............. *B60N 2/2252* (2013.01); *B60N 2/682* (2013.01); *Y10T 29/49826* (2015.01)

(58) Field of Classification Search
USPC .............. 297/362, 362.12, 361.1, 366, 367 R
See application file for complete search history.

(56) References Cited

U.S. PATENT DOCUMENTS

| 5,725,452 | A  | * | 3/1998  | Droulon et al. ............... 475/162 |
| 6,805,650 | B2 | * | 10/2004 | Branov et al. ................. 475/162 |
| 7,753,450 | B2 | * | 7/2010  | Eppert et al. .................. 297/362 |

(Continued)

FOREIGN PATENT DOCUMENTS

| CN | 1799452 | 7/2006 |
| CN | 101495779 | 7/2009 |

(Continued)

OTHER PUBLICATIONS

German Exam Report dated Aug. 13, 2013.

(Continued)

*Primary Examiner* — David R Dunn
*Assistant Examiner* — Timothy J Brindley
(74) *Attorney, Agent, or Firm* — Fletcher Yoder, P.C.

(57) ABSTRACT

A vehicle seat, in particular motor vehicle seat comprises an inclination adjustment fitting, a backrest part, and a seat part. The inclination adjustment fitting has a toothed first element and a toothed second element, and the vehicle seat has a first main structural element and a second main structural element. The inclination adjustment fitting has an adjustment mechanism and/or a latching detent for adjusting the inclination of the first main structural element relative to the second main structural element about an axis of rotation. The toothed first element is connected directly to the first main structural element, and/or the toothed second element is connected directly to the second main structural element.

6 Claims, 10 Drawing Sheets

(56) References Cited

U.S. PATENT DOCUMENTS

| | | | |
|---|---|---|---|
| 7,950,741 B2 * | 5/2011 | Mitsuhashi | 297/362 |
| 8,128,169 B2 * | 3/2012 | Narita et al. | 297/362 |
| 8,152,241 B2 * | 4/2012 | Krueger et al. | 297/367 R |
| 8,262,165 B2 * | 9/2012 | Mitsuhashi | 297/362 |
| 8,590,972 B2 * | 11/2013 | Jiang et al. | 297/362 |
| 8,783,775 B2 * | 7/2014 | Kienke et al. | 297/367 R |
| 2003/0067201 A1 * | 4/2003 | Koczewski | 297/361.1 |
| 2006/0158013 A1 * | 7/2006 | Kawashima et al. | 297/362 |
| 2006/0220430 A1 * | 10/2006 | Baloche Faurecia | 297/362 |
| 2006/0279121 A1 * | 12/2006 | Matsumoto et al. | 297/362 |
| 2008/0106135 A1 * | 5/2008 | Jeong | 297/362 |
| 2009/0224589 A1 * | 9/2009 | Beneker et al. | 297/362 |
| 2009/0236884 A1 * | 9/2009 | Lawall et al. | 297/217.3 |
| 2009/0301247 A1 | 12/2009 | Mitsuhashi et al. | |
| 2011/0156463 A1 * | 6/2011 | Thiel et al. | 297/362 |

FOREIGN PATENT DOCUMENTS

| | | |
|---|---|---|
| DE | 2834707 A1 | 12/1979 |
| DE | 202005021118 | 3/2007 |
| DE | 102006051403 B3 | 2/2008 |
| DE | 102007042604 A1 | 5/2008 |
| JP | 51-77725 | 12/1976 |
| JP | 2001-149161 | 6/2001 |
| JP | 2004-290243 | 10/2004 |
| JP | 2007-143576 | 6/2007 |
| JP | 2008-018054 | 1/2008 |
| JP | 2009-201783 | 9/2009 |
| WO | 2004078512 A2 | 9/2004 |
| WO | 2006040303 A2 | 4/2006 |
| WO | 2008015845 A1 | 2/2008 |

OTHER PUBLICATIONS

Chinese Office Action dated Jan. 6, 2014.
International Search Report for application No. PCT/EP2010/006707 mailed Feb. 16, 2011.
German Examination Report dated Nov. 3, 2010, 4 pgs.
Korean Office Action dated Mar. 28, 2014 with translation.
Japanese Office Action dated Nov. 11, 2013.
International Preliminary Report on Patentability dated May 15, 2012.

* cited by examiner

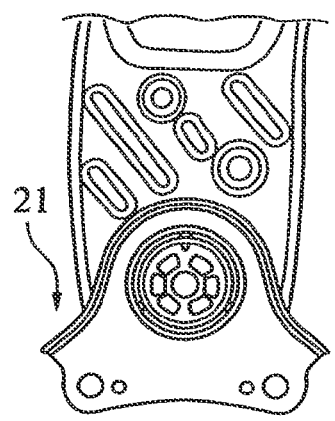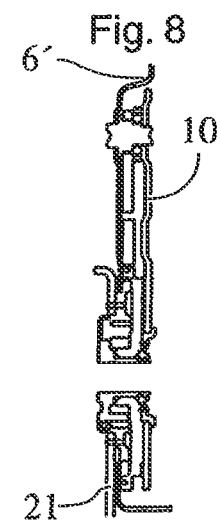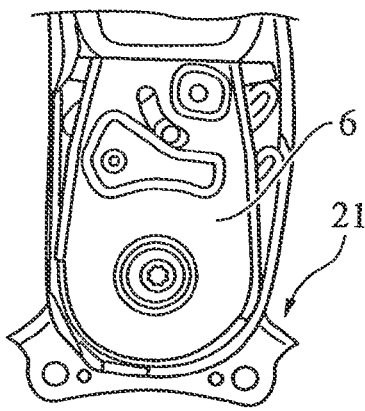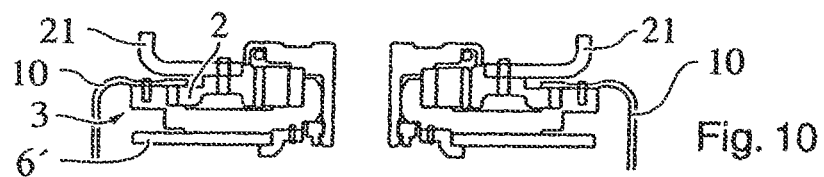

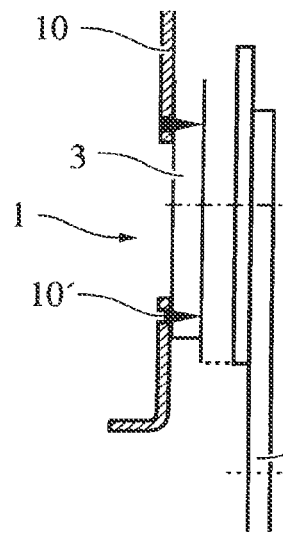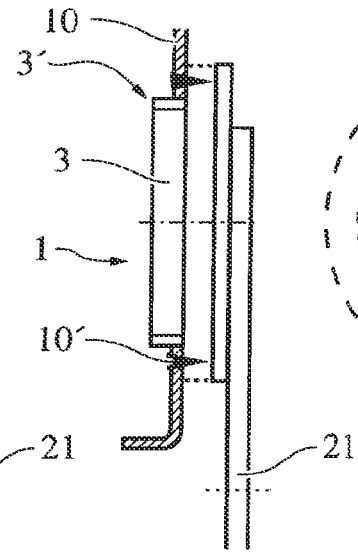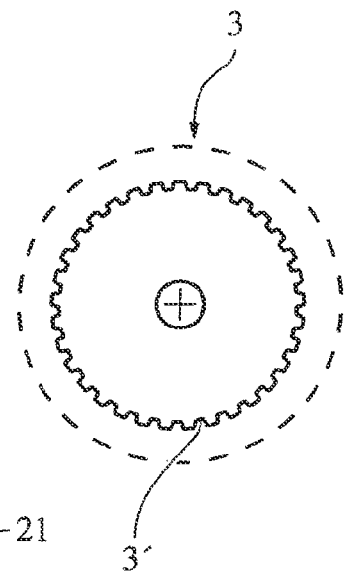
Fig. 15  Fig. 16a  Fig. 16b
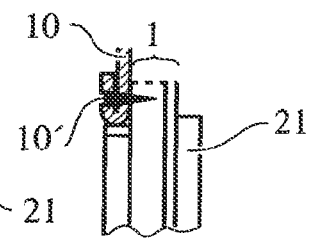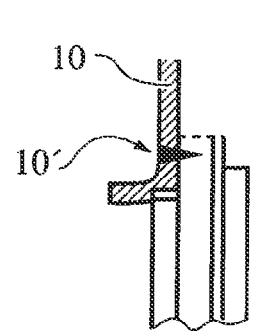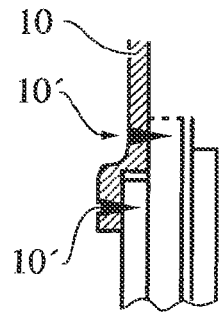
Fig. 17  Fig. 18  Fig. 19  Fig. 20

INCLINATION ADJUSTER FOR VEHICLE SEATS

CROSS REFERENCE TO RELATED APPLICATIONS

This application claims priority from and the benefit of PCT Application No. PCT/EP2010/006707, filed on Nov. 4, 2010; and German Patent DE 10 2009 052 512.2, filed on Nov. 11, 2011; both entitled "Inclination Adjuster for Vehicle Seats", which are herein incorporated by reference.

BACKGROUND

The invention relates to an inclination adjuster for the inclination of a backrest relative to the seat part of a vehicle seat, in particular using a wobble mechanism. For the design and function of inclination adjusters of this type, reference is made to the document WO 2006/040303 A2. Previously known inclination adjusters are customarily connected, for example screwed, riveted or welded, to the backrest or seat part structures by means of tabs protruding beyond the mechanism. In this case, comparatively large forces or torques have to be absorbed by the inclination adjuster or the fitting parts thereof before said forces/torques are conducted into a structural part, for example of the backrest part or else of the seat part, which results in comparatively high costs, a comparatively heavy weight and requires a comparatively large amount of construction space.

It is therefore the object of the present invention to provide a vehicle seat with an inclination adjustment fitting, wherein the inclination adjustment fitting is comparatively small, lightweight and cost-effective on being configured for a predetermined load, and wherein, furthermore, particularly good adaptability to a multiplicity of different construction space requirements or circumstances individual to a vehicle type is possible.

SUMMARY

The object is achieved by a vehicle seat, in particular a motor vehicle seat, with an inclination adjustment fitting, with a backrest part and with a seat part, wherein the inclination adjustment fitting has a toothed first element and a toothed second element, wherein the backrest part has a first main structural element, wherein the seat part has a second main structural element, wherein the inclination adjustment fitting has an adjustment mechanism and/or a latching detent for adjusting the inclination of the first main structural element relative to the second main structural element about an axis of rotation, wherein, furthermore, the toothed first element is connected directly to the first main structural element, and/or wherein the toothed second element is connected directly to the second main structural element. By this means, it is advantageously possible according to the invention to ensure a connection between the inclination adjustment fitting and the backrest and/or the seat part of the vehicle seat, which connection is particularly optimized in terms of weight and construction space. Furthermore, this also enables great variability with regard to the adaptation to different backrest structural parts of different types of vehicles to be realized with a comparatively low outlay on adaptation and, at the same time, an inclination adjustment fitting with very high load-bearing capacity to be provided.

For all of the cohesively bonded connections, which are mentioned within the scope of the present invention, between two parts or regions, it is preferably provided according to the invention to use welding, in particular laser welding. As an alternative thereto, it is, however, also possible to use an adhesive bonding method or an adhesive bond or else a cold metal transfer method or even a friction welding method, by means of which it is possible in particular to produce a connection between different metals, in particular between aluminum, on the one hand, and steel or a steel material, on the other hand.

All of the main structural elements can be designed as what are referred to as tailored blank components (i.e. structural elements or components which are constructed from at least two different interconnected base materials (of, for example, different material thickness or else strength). In the present invention, it is particularly possible here to arrange the boundary of the base materials above the inclination adjustment fitting.

According to the invention, it is particularly preferred that the first main structural element, the second main structural element and the toothed first and second elements are in each case arranged on both sides of the vehicle seat, wherein at least one transverse element is provided between the first main structural elements and between the second main structural elements in a manner connected to the main structural elements. By this means, it is advantageously possible for the vehicle seat and the connection between the backrest and the seat part to be implemented via the inclination adjustment fitting without additional adapter elements, which results in a cost-effective vehicle concept which is optimized in terms of construction space and weight. In particular, it is provided in this embodiment that two transverse elements (in particular tubular elements or transverse tubes) are provided between the two second main structural elements of the vehicle seat (for example the seat part), which are opposite each other on both sides, and that a transverse element (transverse tube) is provided between the two first main structural elements of the vehicle seat (for example the backrest part), which are opposite each other on both sides. The transverse elements are connected to the first and/or second main structural elements in particular in a cohesively bonded manner, for example by means of welding. As an alternative thereto, the transverse elements can also be connected by means of deformation, for example by means of crimping. It is preferred for all of the transverse elements to be arranged substantially parallel to one another. Instead of transverse elements, use may also be made according to the invention in this embodiment of transverse elements which are designed as pressed steel components or bent steel components or extruded components (for example manufactured from an aluminum material and/or from a magnesium material). Such an embodiment has the advantage that the preassembled elements of the inclination adjustment fitting and connected main structural elements (prior to the connection thereof by means of the transverse elements) can be transported particularly readily (and with little need for space). The transverse elements can then be fitted in situ.

Furthermore, it is preferably provided according to the invention that the toothed first element is connected directly to the first main structural element, and that the toothed second element is connected directly to a second adapter element and the second adapter element is connected directly to the second main structural element, and that the toothed second element is connected directly to the second main structural element, and that the toothed first element is connected directly to a first adapter element and the first adapter element is connected directly to the first main structural element. By means of a direct connection of the toothed first element to the first main structural element (in particular of the backrest part) and of the toothed second element to the second main structural element (in particular of the seat part), it is possible according to the invention that a stable connection can be produced with little outlay on construction space, costs, material and weight. By means of an indirect connection via an intermediate element, it is advantageously possible according to the invention that particularly great variability with respect to the adaptability to different types of vehicle can be obtained. By means of the use of an adapter element, it is advantageously possible according to the invention that tolerances can be particularly simply compensated for, and that a separate and the therefore simplified trimability (i.e. the possibility of fitting a cover or a visible side cover) of the backrest, on the one hand, and seat part, on the other hand, is provided. Furthermore, in the embodiment with an adapter element, good transportability of the backrest part, on the one hand, and seat part, on the other hand, prior to final installation of the vehicle seat is advantageously possible.

Furthermore, it is also preferred according to the invention that the toothed first element and the toothed second element are arranged substantially entirely on a first side with respect to a connecting plane between the first main structural element, on the one hand, and the toothed first element, on the other hand, and a connecting plane between the second main structural element or a second adapter element, on the one hand, and the toothed second element, on the other hand, is arranged on a second side opposite the first side. This makes it possible to ensure a comparatively high degree of stability of the connection of the inclination adjustment fitting to the first and second main structural element of the backrest and/or of the seat part in a small space and therefore with a comparatively low outlay on material.

It is particularly preferred if the toothed first element is connected in a cohesively bonded manner to the first main structural element (in particular of the backrest part), in particular by means of laser welding or by means of a plurality of laser welding operations. By this means, a vehicle seat and inclination adjustment fitting according to the invention can be simply and rapidly realized in a manner optimized with respect to the installation and production costs.

Furthermore, it is preferred according to the present invention that the inclination adjustment fitting has a free-pivoting arrangement such that an additional functionality of the vehicle seat can be realized in an advantageous manner, for example a forward-folding functionality, e.g. for permitting easy entry of passengers into the vehicle and exit of passengers from the vehicle.

According to the invention, it is furthermore preferred that the inclination adjustment fitting has a retaining element, wherein the retaining element is connected to the toothed first element and axially secures the toothed second element.

The present invention furthermore relates to a method for installing a vehicle seat, wherein, in a first step, an adjustment mechanism is fitted, wherein, in a second step, the adjustment mechanism is connected via a toothed first element to a first main structural element of the vehicle seat, and wherein, in a third step, a toothed second element is connected to a second main structural element or to a second adapter element of the vehicle seat. By this means, optimized and cost-effective production and installation of the vehicle seat are possible in an advantageous manner because the individual production steps can be separated insofar as no welding steps are required, for example, when assembling the adjustment mechanism.

DRAWINGS

Exemplary embodiments of the invention are illustrated in the drawing and explained in more detail in the description below.

FIGS. 1, 2, 3 and schematically show, according to different views, a first embodiment of the connection of an inclination adjustment fitting to a vehicle seat according to the invention.

FIGS. 5, 6, 7, 8, 9 and 10 show schematically, according to different views, a second embodiment of the connection of an inclination adjustment fitting to a vehicle seat according to the invention.

FIGS. 15, 16a, 16b, 17, 18, 19, 20, 21, 22, 23, 24, 25, 26, 27, 28 and 29 show different alternatives of a connection of a backrest side part to an inclination adjustment fitting or of a backrest side part and a backrest transverse part to an inclination adjustment fitting on a vehicle seat according to the invention.

DETAILED DESCRIPTION

Figure 1:
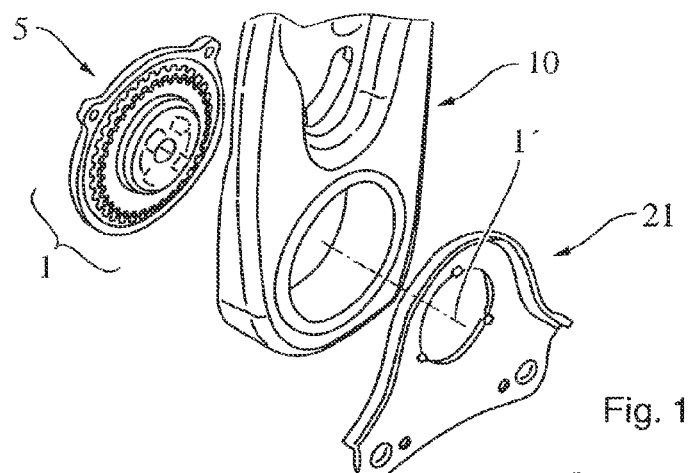

FIGS. 1 to 40 show by way of example and schematically various alternatives of a vehicle seat according to the invention with an inclination adjustment fitting and of parts of the vehicle seat or of the adjustment fitting in various views. The vehicle seat has a backrest which can be adjusted in inclination by means of the inclination adjustment fitting, also referred to below as the backrest part, and a seat part. The inclination adjustment fitting, also referred to below as the inclination adjuster 1 or adjustment fitting 1, in each case bears the reference number 1. This adjustment fitting 1 comprises in particular an adjustment mechanism 5, particularly preferably of a wobble mechanism type. As an alternative thereto, the adjustment fitting 1 may also be designed as what is referred to a latching fitting, although, within the context of the present description, the starting point is primarily a gear fitting, in particular designed in the form of a wobble mechanism. In each case, the adjustment fitting 1 comprises an axis of rotation 1'. A toothed first element 3 and a toothed second element 2 are provided adjustably relative to each other about the axis of rotation 1'. By this means, the inclination of the backrest is adjusted. According to the invention, the toothed first element 3 and the toothed second element 2 can interact with each other in accordance with an adjustment mechanism or else in accordance with a latching fitting. In the event of a wobble mechanism, the toothed first element 3 and the toothed second element 2 are part of an adjustment mechanism 5. In particular, it is provided that the toothed first element 3 is designed as an internally toothed gearwheel and that in particular the toothed second element 2 is designed as an externally toothed gearwheel, wherein the externally toothed second element 2 having a smaller number of teeth (than the number of teeth of the internally toothed gearwheel) revolves in the internally toothed gearwheel (first element 3) and is mounted eccentrically in a known manner by means of wedge elements. In the event of a latching fitting (latching recliner), the toothed first element 3 is in this case a toothed plate (a latching part) and the toothed second element 2 is a baseplate with one or more toothed detent elements (i.e. which are provided with teeth).

The vehicle seat has a first main structural element 10 and a second main structural element 20, which are connected to each other so as to be adjustable in inclination via the inclination adjustment fitting. In particular, the first and second main structural elements 10, 20 are designed as side parts of the backrest or of the seat part such that, by means of an arrangement of in each case two first main structural elements 10 and two second main structural elements 20 and in each case of an inclination adjustment fitting between a first main structural element 10 and a second main structural element 20, a stable vehicle seat can be realized. Various embodiments or alternatives of the connection between the backrest part, the adjustment fitting 1 and the seat part just on one side of the vehicle seat are discussed below wherein it is assumed that a substantially symmetrical arrangement thereto is also located on the opposite side of the vehicle seat. For the sake of simplicity, the first main structural element 10 is referred to below primarily as the side part or main structural element of the backrest and the second main structural element 20 is primarily referred to as the side part or main structural element of the seat part, but this assignment should not be interpreted as limiting the concept of the invention but rather merely having been selected for the purpose of simpler depiction. Of course, the first main structural element 10 may also be provided as the side part of the seat part and the second main structural element 20 as the side part of the backrest part.

According to the invention it is provided that at least the first main structural element 10 is connected directly to the toothed first element 3 or else that the second main structural element 20 is connected directly to the toothed second element 2. However, according to the invention, it is also possible for both the first main structural element 10 to be connected directly to the toothed first element 3 and at the same time for the second main structural element 20 to be connected directly to the toothed second element 2. If the toothed first element 3 is not connected directly to the first main structural element 10, a first adapter element 11 is provided therebetween. If the toothed second element 2 is not connected directly to the second main structural element 20, a second adapter element 21 is provided therebetween.

Figure 2:
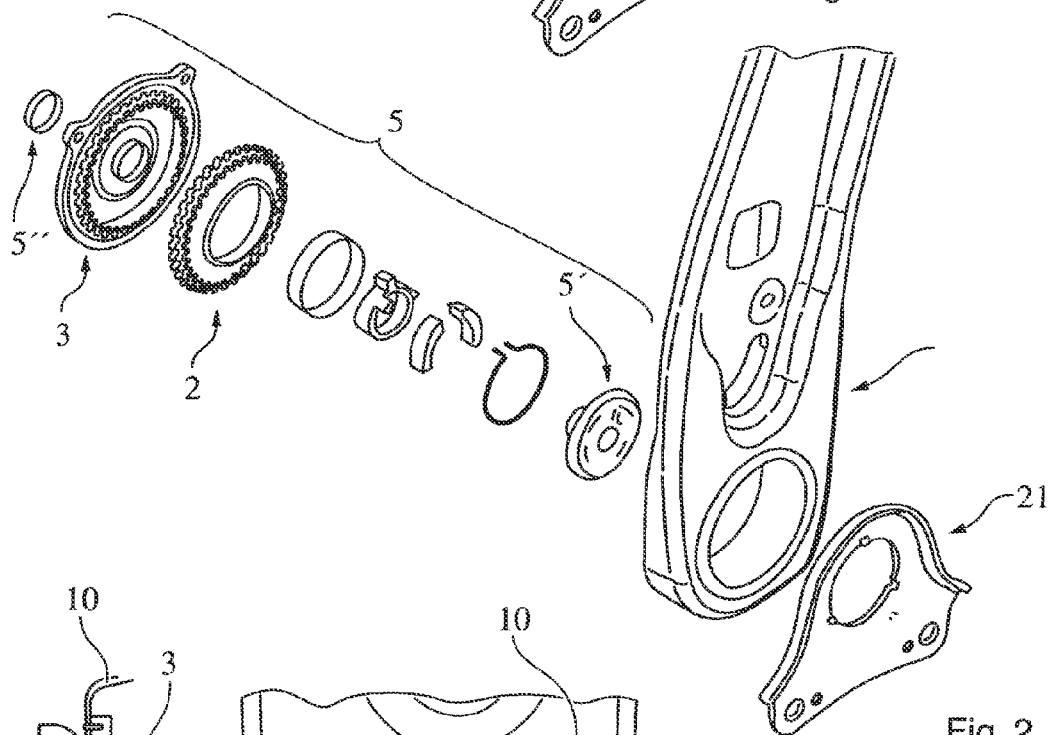
Figure 3:
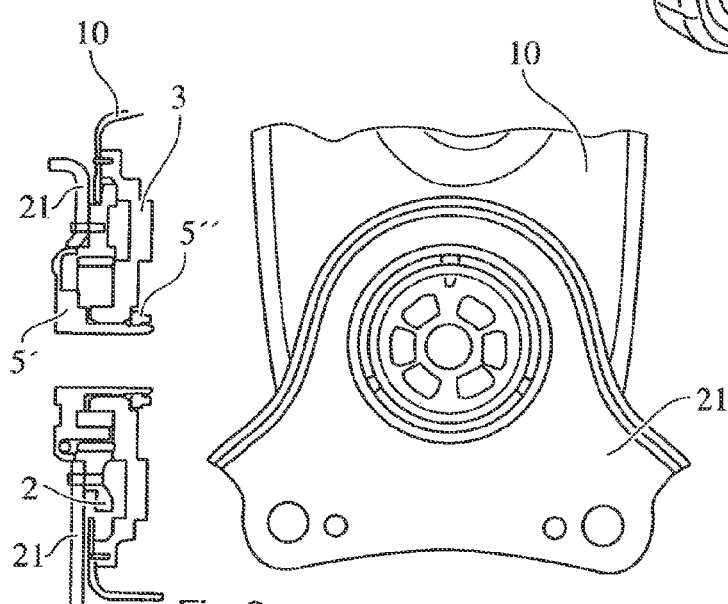
Figure 4:
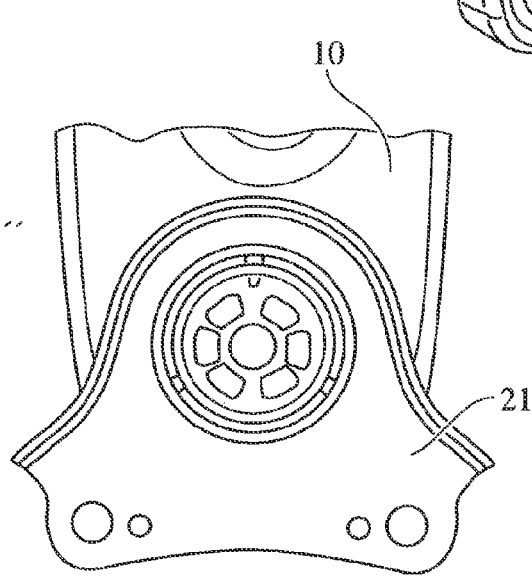

FIGS. 1, 2, 3 and 4 illustrate schematically, according to various views, a first embodiment of the connection of an inclination adjustment fitting 1 to a vehicle seat according to the invention. FIG. 1 illustrates a perspective, simplified exploded illustration of this connection, wherein the first main structural element 10, a second adapter element 21 and the adjustment mechanism 5 are illustrated. FIG. 2 illustrates a perspective detailed exploded illustration of this connection, wherein the first main structural element 10, the adapter element 21 and the adjustment mechanism 5 with the toothed first element 3, the toothed second element 2 and two axial transport securing elements (cap 5' and axial transport securing element 5") are illustrated. FIG. 3 schematically illustrates a sectional illustration according to a section parallel to the axis of rotation 1'. FIG. 4 illustrates a top view of the connection of the second adapter element 21 to the first main structural element 10.

Figure 5:
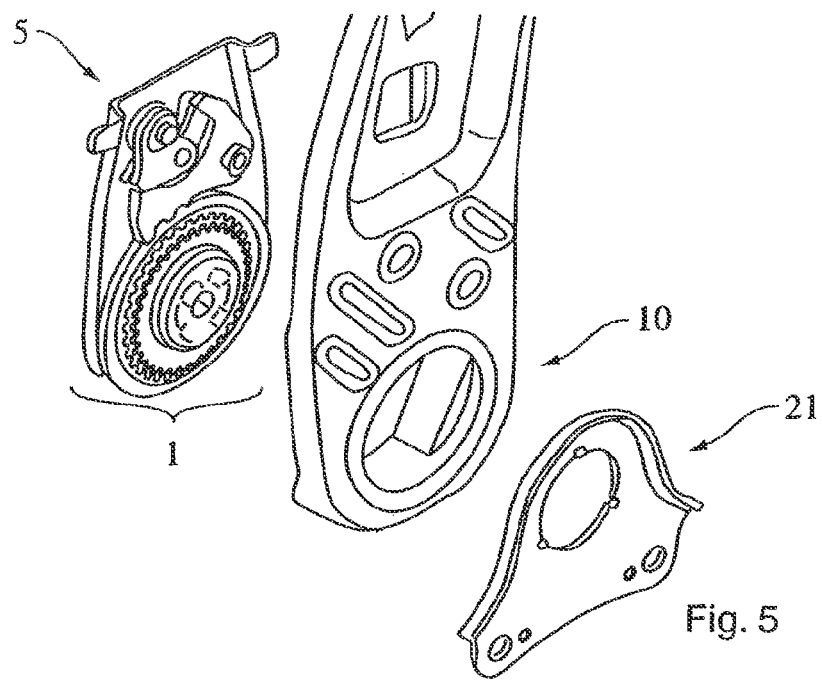
Figure 6:
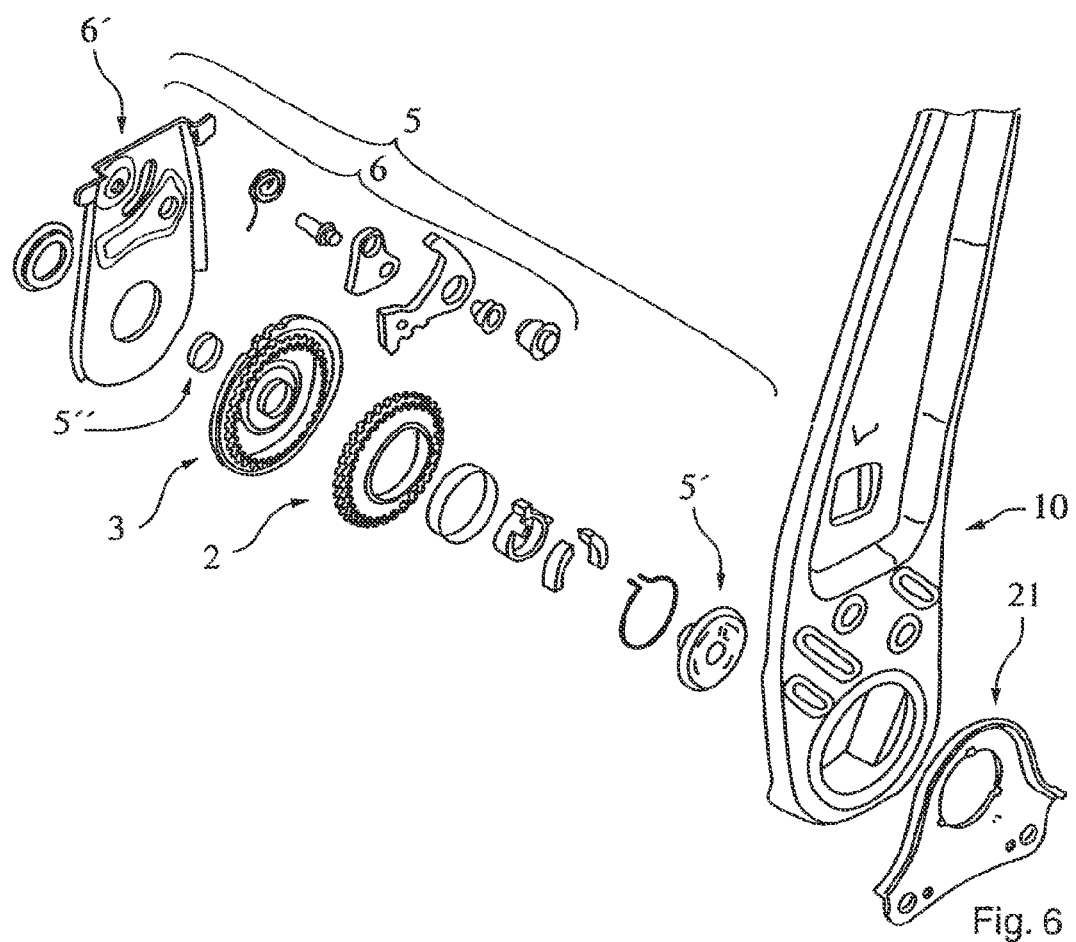

FIGS. 5, 6, 7, 8, 9 and 10 illustrate schematically, according to various views, a second embodiment of the connection of the inclination adjustment fitting 1 to the vehicle seat according to the invention. FIG. 5 illustrates a perspective, simplified exploded illustration of said connection, wherein the first main structural element 10, the second adapter element 21 and the adjustment mechanism 5 are illustrated. FIG. 6 illustrates a perspective more detailed exploded illustration of said connection, wherein the first main structural element 10, the adapter element 21 and the adjustment mechanism 5 with the toothed first element 3, the toothed second element 2, a free-pivoting arrangement 6, a free-pivoting fitting element 6' and the axial transport securing elements or cap 5', 5" are illustrated. According to the invention, a free-pivoting functionality (for example an easy entry functionality) is therefore possible by means of the second embodiment of the connection of the inclination adjustment fitting. FIGS. 8 and 10 each schematically illustrate a sectional illustration according to a section parallel to the axis of rotation 1'. FIGS. 7 and 9 each show a top view of the connection of the second adapter element 21 to the first main structural element 10 from different sides. According to the invention, it is advantageously possible in the second embodiment for the free-pivoting arrangement 6 to be able to be arranged on the inside such that there is a smaller requirement for construction space (better packaging) and the trim panel is simplified. Furthermore, an arrangement of this type can be provided in modular form with the first embodiment, i.e. it is possible, for example, to realize an identical width in the transverse direction of the vehicle (what is referred to as the Y direction) of the connection points such that the connection to a seat part does not require any bent adapter plates which may be disadvantageous with regard to the mechanical stability thereof. Furthermore, a greater number of identical parts can thereby be used.

Figures 32, 33, 34:
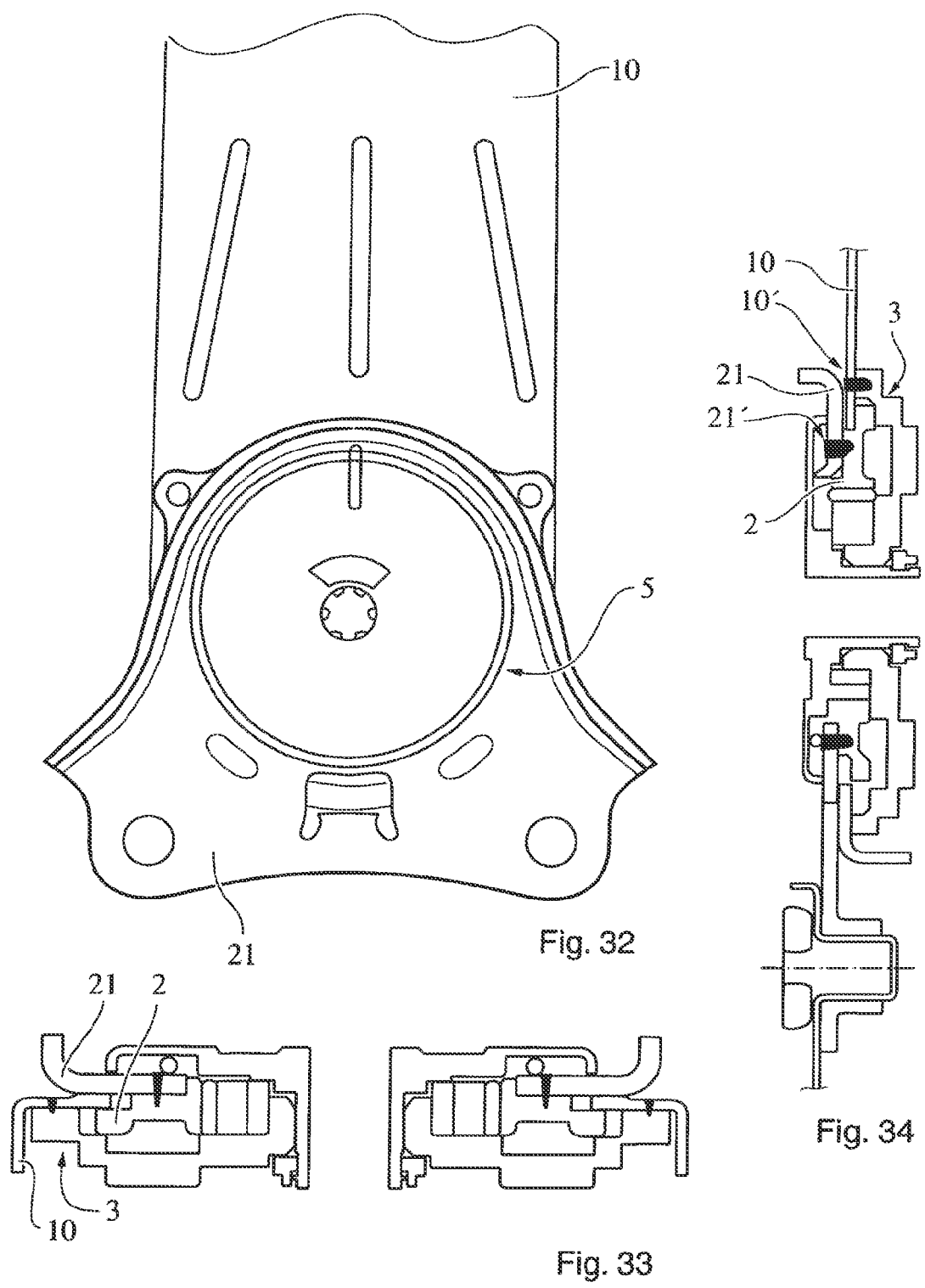
FIGS. 32, 33, 34 and 35 show schematically, according to different views, a fourth embodiment of the connection of an inclination adjustment fitting to a vehicle seat according to the invention.
Figure 35:
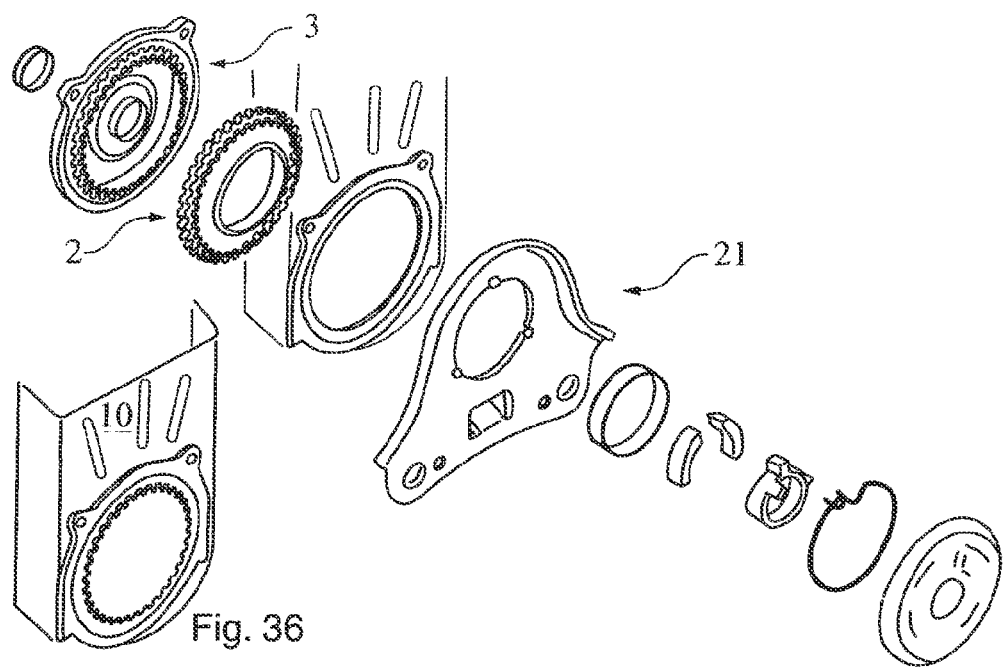

FIGS. 32, 33, 34 and 35 illustrate schematically, according or various views, a fourth embodiment of the connection of an inclination adjustment fitting 1 to a vehicle seat according to the invention. FIG. 32 schematically illustrates a top view of said connection, wherein the first main structural element 10, a second adapter element 21 and the adjustment mechanism 5 are illustrated. FIG. 35 illustrates a perspective exploded illustration of said connection, wherein the adapter element 21, the toothed first element 3, the toothed second element 2 and the two axial transport securing elements or cap are illustrated. FIGS. 33 and 34 each schematically illustrate a sectional illustration according to a section parallel to the axis of rotation 1', wherein the points of the cohesively bonded connection 10', 21' between the first main structural element 10 and the toothed first element 3 and between the second adapter element 21 and the toothed second element 2 are marked by means of arrows. In the fourth embodiment, the retaining element 4 may be omitted, and therefore the inclination adjustment fitting 1 can be designed to be lighter and more cost-effective. Furthermore, a better force flux between the backrest and seat part is thereby possible via the inclination adjustment fitting 1 because the force admission plane of the first main structural element 10 and the force admission plane of the second main structural element 20 (or alternatively of respective adapter elements 11 and 21) lie very closely adjacent to each other and therefore opening torques can be reduced (with otherwise identical conditions).

Figure 36:
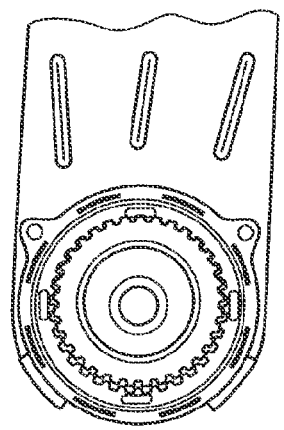
FIG. 36 shows schematically an alternative of the fourth embodiment of the connection of the inclination adjustment fitting.
Figure 37:
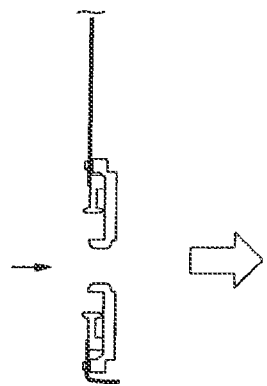
FIGS. 37, 38, 39 and 40 show schematically a sequence of installation steps in the fourth embodiment of the connection of the inclination adjustment fitting to the vehicle seat according to the invention.
Figure 38:
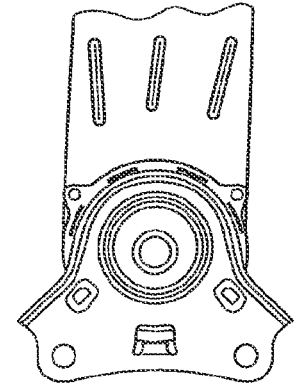
Figure 40:
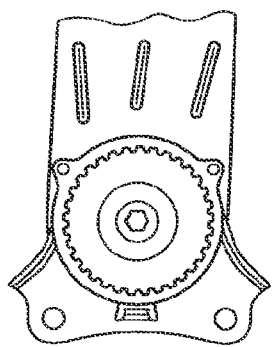
Figure 39:
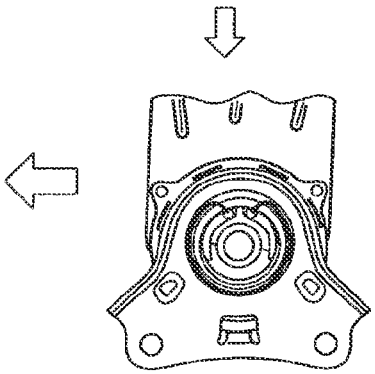

FIG. 36 schematically shows an alternative of the fourth embodiment of the connection of the inclination adjustment fitting, in which the (internally) toothed first element 3 is provided integrated with the backrest side part 10.

FIGS. 37, 38, 39 and 40 schematically show a sequence of installation steps in the fourth embodiment of the connection of the inclination adjustment fitting 1 to the vehicle seat according to the invention. In a first step (FIG. 37), the toothed second element 2 is fitted to the toothed first element 3 and is connected, in particular in a cohesively bonded manner, to the first main structural element 10 (or to the backrest side part 10 in the example illustrated). In a second step (FIG. 38), the second adapter element 21 is connected, in particular in a cohesively bonded manner, to the toothed second element 2. In a third step (FIG. 39), the eccentric elements (such as two wedge elements, a spring, etc.) are fitted and, in a fourth step (FIG. 40), trim panel elements are fitted.

Figure 11:
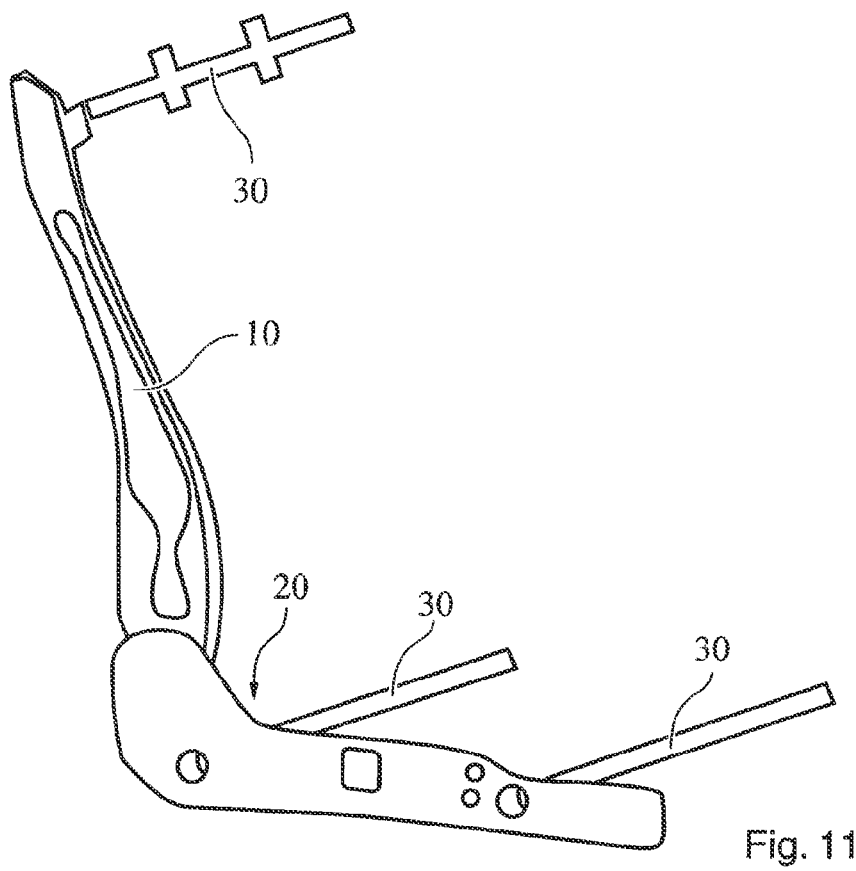
FIG. 11 shows schematically a seat construction of a vehicle seat according to the invention.

FIG. 11 schematically shows a seat design of a vehicle seat according to the invention. An arrangement of a first main structural element 10 and a second main structural element 20 with a inclination adjuster 1 (not illustrated in FIG. 11) located in between is provided in a manner connected by means of a plurality of transverse elements 30 to a second arrangement (not illustrated in FIG. 11) of a first main structural element 10 and a second main structural element 12. In this case, it is provided, for example, that two transverse elements 30 are arranged in the region of the seat part (wherein these two transverse elements 30 in particular contain what are referred to as kinematic levers, but the kinematic levers are not illustrated) and that a transverse element 30 (in particular containing receptacles for the head restraint) is arranged in the region of the backrest. According to the invention, the transverse elements 30 are connected to the first and second main structural element 10, 20, for example by means of welding; however, they may also be connected by means of a deformation step, for example by crimping.

Figures 12, 13, 14:
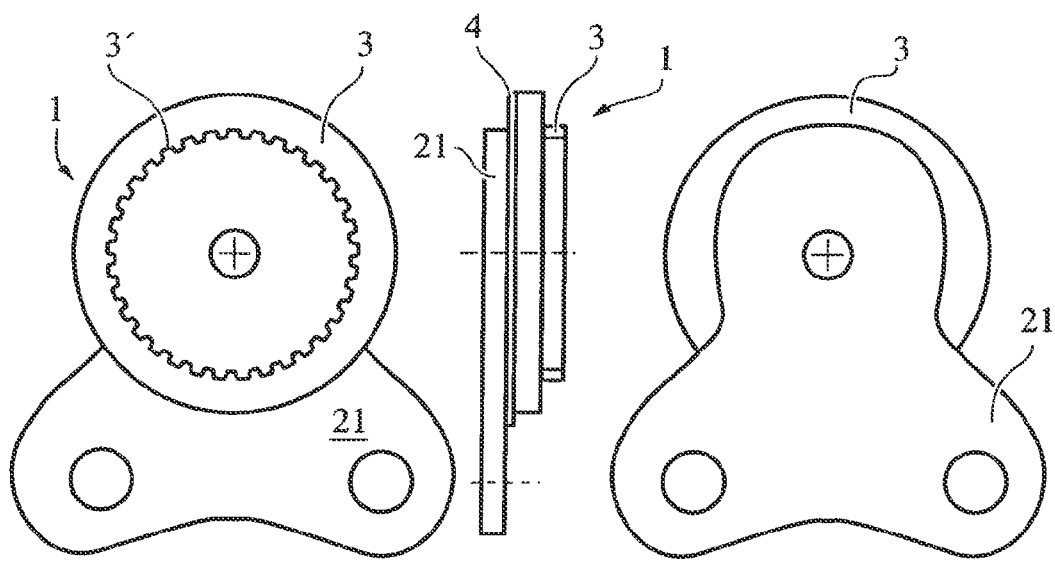
FIGS. 12, 13 and 14 show a third embodiment of the connection of an inclination adjustment fitting to a vehicle seat according to the invention.
Figure 21:
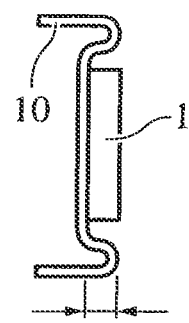

FIGS. 12, 13 and 14 show a third embodiment of the connection of the inclination adjustment fitting 1 to the vehicle seat according to the invention. In this case, FIG. 13 schematically illustrates a side view of the second adapter element 21 and of the inclination adjustment fitting 1. FIGS. 12 and 14 each illustrate a top view of the connection of the second adapter element 21 to the inclination adjustment fitting 1 from different sides. It can be seen, in particular in FIG. 13, that a retaining element 4 (also referred to as a retaining plate 4 or a "retainer plate" or "retainer ring") is provided, said retaining element being connected to the toothed first element 3 by the toothed second element 2 after installation of the toothed first element 3 and thus causing the adjustment mechanism 5 to be held together axially.

FIGS. 15, 16a, 16b, 17, 18, 19, 20, 21, 22, 23 and 24 illustrate various alternatives of a connection of a backrest side part to an inclination adjustment fitting 1 on a vehicle seat according to the invention, wherein such a connection of the backrest side part to the inclination adjustment fitting 1 is provided in particular for combination with the third embodiment according to FIGS. 12, 13 and 14. It is assumed here that the backrest side part is the first main structural element 10. FIG. 15 illustrates, in a side illustration, a variant embodiment of the connection of the backrest side part 10 to the inclination adjustment fitting 1, in which an overlapping region is provided between the first main structural element 10 and the inclination adjustment fitting 1, in particular the toothed first element 3, wherein, in particular, a cohesively bonded connection 10', for example by means of welding, is realized in the overlapping region. FIG. 16a illustrates, in a side illustration, a variant embodiment of the connection of the backrest side part 10 to the inclination adjustment fitting 1, in which a different overlapping region is provided between the first main structural element 10 and the inclination adjustment fitting 1, in particular the toothed first element 3, wherein, in particular, a cohesively bonded connection 10' is realized, for example by means of welding, in the overlapping region. It can be seen both in FIG. 15 and in FIG. 16a that the toothed first element 3 has embossed shoulders 3' leading to steps in the side illustration. By adaptation of the backrest side part 10 to embossed shoulders of this type (which are provided in particular for bringing about the internal toothing (located on the opposite side)), it is furthermore possible to realize a form-fitting connection between the backrest side part 10 (or first main structural element 10) and the toothed first element 3, which further increases the stability of the connection. A form-fitting connection of this type is illustrated schematically in FIG. 16b which shows a top view of the outer side (i.e. the side facing away from the mechanism side) of the toothed first element 3. FIGS. 17, 18, 19 and 20 each illustrate, in side view, further alternatives of the connection of the backrest side part 10 to the inclination adjustment fitting 1. It is provided here, according to FIGS. 17 and 18, that the material of the backrest side part 10 is folded over or doubled in the overlapping region and is thereby reinforced. The doubling of the material can extend here circumferentially over the entire connection region between the backrest side part 10 and the inclination adjustment fitting 1 or else can be restricted (for example with the aid of folded-over tabs) to one region or more than one region which are separated from one another. It is provided, according to FIGS. 19 and 20, for the material of the backrest side part 10 to be deep-drawn in the overlapping region and thereby to be reinforced. It is advantageously possible here for even a plurality of connections 10' to be able to be provided in the overlapping region, wherein it is also possible according to the invention to provide just one connection 10'.

Figure 22:
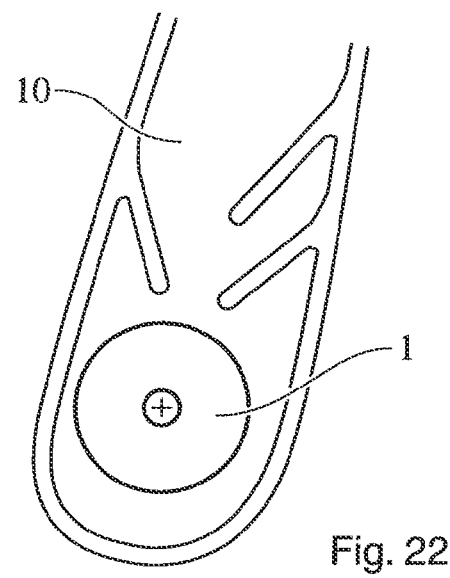
Figure 23:
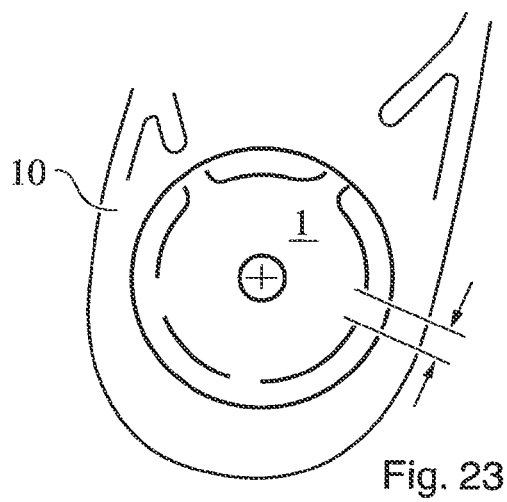
Figure 24:
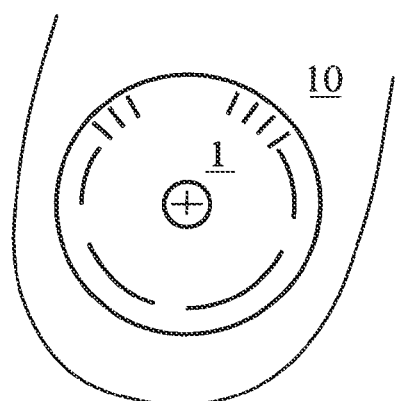
Figure 25:
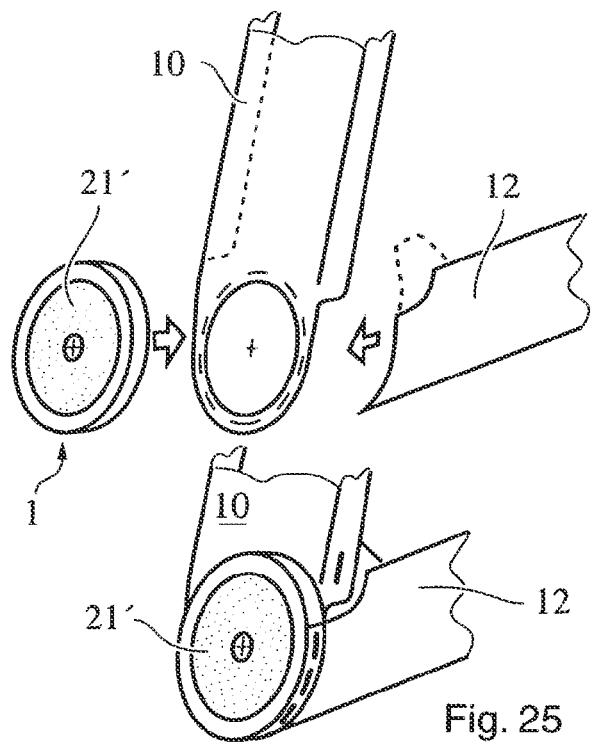
Figure 26:
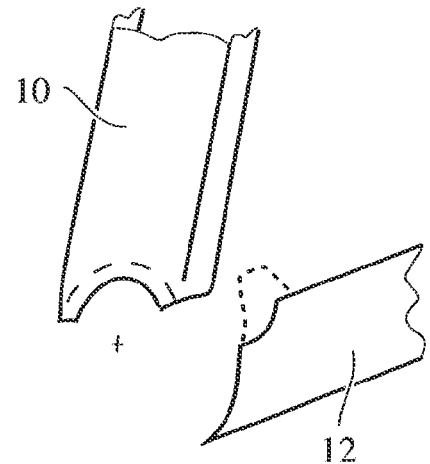

Corresponding to the illustration in FIGS. 16a and 16b, it is also advantageously possible, according to FIGS. 17, 18, 19 and 20, to bring about a form-fitting connection (owing to the embossing of the toothed first element 3b) of the backrest side part 10 to the inclination adjustment fitting 1 as an assisting measure in addition to the cohesively bonded connection. According to the invention, it is preferably provided that the backrest side part 10 is shaped in such a manner that the connecting plane to the adjustment fitting 1 coincides with the center of thrust or is in the spatial vicinity thereof. This permits particularly great stability of the connection or at the connection between the backrest side part 10 and inclination adjustment fitting 1. FIGS. 22, 23 and 24 illustrate further alternatives of the configuration of the backrest side part 10 in top views, wherein, according to FIG. 22, embossed ribs are provided in the material of the backrest side part 10, wherein, according to FIG. 23, changes in direction or interruptions of welded seams (or of the points of the cohesively bonded connection) are provided, and wherein, according to FIG. 24, the choice of the welding geometry or the choice of the connection points of the cohesively bonded connection varies along the circumference of the connection region. All of the measures shown in FIGS. 21, 22, 23 and 24 aim to ensure optimized admission of force from the backrest side part 10 into the inclination adjustment fitting 1 such that, especially in the event of an increased load absorption, an increase in the material thickness over large regions of the backrest side part 10 and/or of the inclination adjustment fitting 1, which increase is suboptimal in terms of weight and/or space, is not required.

Figure 27:
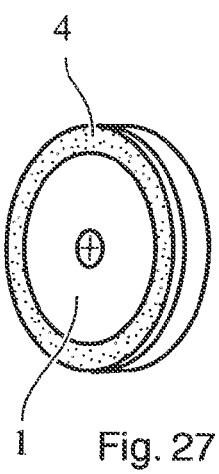
Figure 28:
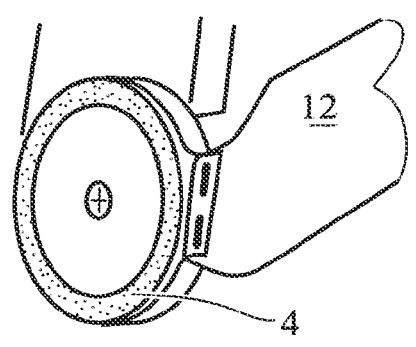
Figure 29:
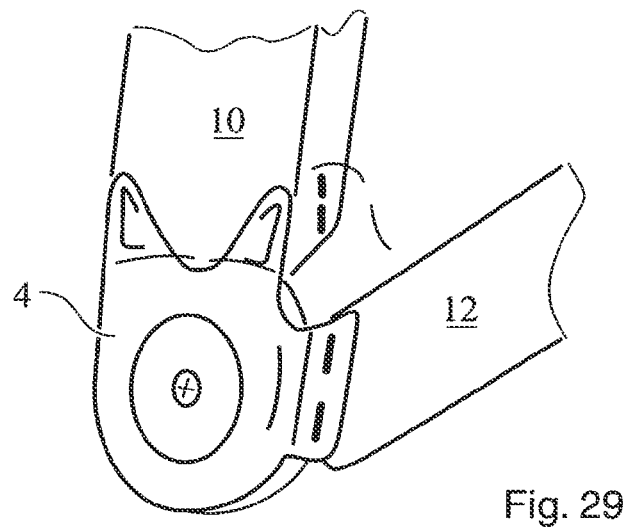

FIGS. 25, 26, 27, 28 and 29 illustrate various alternatives of a connection of a backrest side part and of a backrest transverse part 12 to an inclination adjustment fitting 1 on a vehicle seat according to the invention, wherein such a connection of the backrest side part and of the backrest transverse part 12 to the inclination adjustment fitting 1 is provided in particular for combination with the third embodiment according to FIGS. 12, 13 and 14 and wherein the connection of the backrest side part to the inclination adjustment fitting 1 is brought about in particular via the retaining element 4. The starting point here is that the backrest side part is the first main structural element 10. According to the variant embodiment of FIG. 25 (an exploded illustration of the backrest side part 10, of the inclination adjustment fitting 1 and of the backrest transverse part 12 is illustrated schematically in the upper illustration and the lower illustration illustrates same in assembled form), the backrest transverse part 12 and the backrest side part 10 are connected to the inclination adjustment fitting 1, wherein the inclination adjustment fitting 1 is connected in a completely encircling manner to the backrest side part 10. According to the variant embodiment of FIG. 26, the backrest transverse part 12 and the backrest side part 10 are connected to the inclination adjustment fitting 1, wherein the inclination adjustment fitting 1 is connected to the backrest side part 10 only in a partially encircling manner. By means of the variant embodiments according to FIGS. 25 and 26, it is particularly advantageously possible according to the invention for a thinner backrest (i.e. of less deep design) to be able to be realized, thus being able to save both on weight and costs; furthermore, a more flexible positioning of the pivot point (i.e. of the axis of rotation 1') between the backrest and the seat part within the entire construction space of the backrest is possible, thus enabling in particular an improved "meat to metal" spacing to be obtained. According to FIGS. 28 and 29, the retaining element 4, which is only illustrated in circular form in FIG. 27, is illustrated with tabs for connection to the backrest side part 10 and/or to the backrest transverse part 12. In this case, it is possible according to the invention for the tabs of the retaining element 4 to be bent over for the connection. By means of the realization of tabs on the retaining element 4, part of the first main structural element 10 can be omitted and, as a result, weight and unnecessary doublings of material can be avoided. By this means, it is advantageously possible for a motor to be able to be formed with the inclination adjustment fitting as a preassembled construction unit. It is thereby possible according to the invention for the inclination adjustment fitting 1 to have the retaining element 4 in such a manner that the retaining element 4 is connected to the toothed first element 3 and axially secures the toothed second element 2, for, furthermore, the retaining element 4 to be connected directly to the first main structural element 10 and for, furthermore, the main structural element 10 to end before the region of the inclination adjustment fitting 1, i.e. the main structural element 10 is not present in the region of the inclination adjustment fitting 1 or has been "cut out". Within the context of the present invention, the region of the inclination adjustment fitting should be understood as meaning that the main structural element ends at a spacing of approx. 1 centimeter to approx. 6 centimeters, preferably at a spacing of approx. 1.5 centimeters to approx. 3 centimeters.

Figure 30:
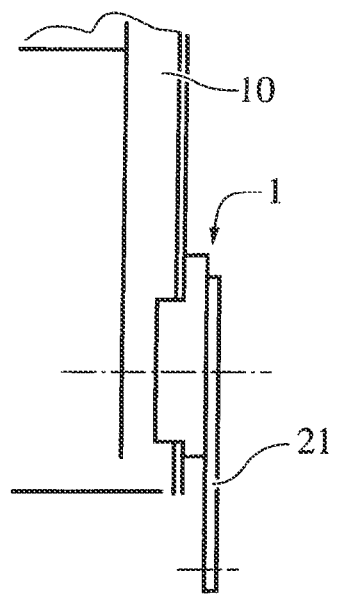
FIGS. 30 and 31 show schematically two different alternative of an arrangement of an inclination adjustment fitting relative to a backrest and a seat part on a vehicle seat according to the invention.
Figure 31:
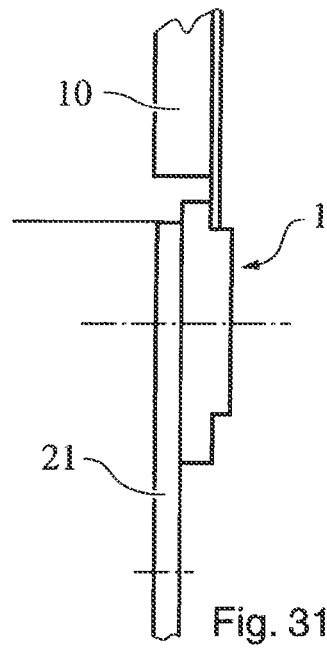

FIGS. 30 and 31 show schematically two different alternatives of an arrangement of an inclination adjustment fitting 1 relative to a backrest and a seat part on a vehicle seat according to the invention. It can be seen that both a sequence (towards the seat center plane) of "seat part, inclination adjustment fitting 1, backrest", as illustrated in FIG. 30, and also a sequence (towards the seat center plane) of "backrest, inclination adjustment fitting 1, seat part", as illustrated in FIG. 31, are possible.

The invention claimed is:

1. A vehicle seat comprising an inclination adjustment fitting, a backrest part, and a seat part, wherein the backrest part comprises a first main structural element, and the seat part comprises a second main structural element, the inclination adjustment fitting comprises an adjustment mechanism, the adjustment mechanism comprises a toothed first element and a toothed second element, and the inclination adjustment fitting comprises a latching detent configured to adjust an inclination of the first main structural element relative to the second main structural element about an axis of rotation;
   wherein the toothed first element is connectable directly to the first main structural element, the toothed second element is connectable directly to a second adapter element, and the second adapter element is connectable directly to the second main structural element, or wherein the toothed second element is connectable directly to the second main structural element, the toothed first element is connectable directly to a first adapter element, and the first adapter element is connectable directly to the first main structural element;
   wherein a substantial portion of the toothed first and second elements is arrangeable on a first side of a first substantially vertical connecting plane between the first main structural element and the toothed first element, and the first connecting plane is substantially parallel to a plane spanned by the first main structural element;
   wherein a substantial portion of the toothed first and second elements is arrangeable on a first side of a second connecting plane between the first main structural element or the second adapter element and the toothed second element, and the second connecting plane is substantially parallel to the first connecting plane; and
   wherein the second main structural element, the second adapter element, and the second connecting plane are arrangeable on a second side of the first connecting plane, and the second side of the first connecting plane is opposite the first side of the first connecting plane.

2. The vehicle seat as claimed in claim 1, wherein respective sides of the vehicle seat each include a respective first main structural element, a respective second main structural element, and respective toothed first and second elements at least one transverse element is provided between the respective first main structural elements and between the respective second main structural element, and the at least one transverse element is connected to the respective main structural elements.

3. The vehicle seat as claimed in claim 1, wherein the inclination adjustment fitting has a free-pivoting arrangement.

4. The vehicle seat as claimed in claim 1, wherein the inclination adjustment fitting has a retaining element connected to the toothed first element and axially secures the toothed second element.

5. The vehicle seat as claimed in claim 4, wherein the retaining element is connected directly to the first main structural element, and the first main structural element ends before a region of the inclination adjustment fitting.

6. A method for manufacturing the vehicle seat of claim 1, wherein, in a first step, the adjustment mechanism is fitted, and wherein, in a second step, the adjustment mechanism is connected via the toothed first element to the first main structural element of the vehicle seat, and wherein, in a third step, the toothed second element is connected to the second main structural element or to the second adapter element of the vehicle seat;
   wherein the toothed first element is connected directly to the first main structural element, the toothed second element is connected directly to the second adapter element, and the second adapter element is connected directly to the second main structural element, or wherein the toothed second element is connected directly to the second main structural element, the toothed first element is connected directly to the first adapter element, and the first adapter element is connected directly to the first main structural element;

wherein the substantial portion of the toothed first and second elements is arranged on the first side of the first connecting plane between the first main structural element and the toothed first element;

wherein the substantial portion of the toothed first and second elements is arranged on the first side of the second connecting plane between the second main structural element or the second adapter element and the toothed second element; and wherein the second main structural element, the second adapter element, and the second connecting plane are arranged on the second side of the first connecting plane.

* * * * *